United States Patent [19]
Thiessen

[11] Patent Number: 5,647,882
[45] Date of Patent: Jul. 15, 1997

[54] APPARATUS FOR THE HEATING OR COOLING OF PLATE-LIKE OR SHEET-LIKE FLAT GLASS

[75] Inventor: Volker Thiessen, Aachen, Germany

[73] Assignee: Cattin Machines S.A., Fonds, Switzerland

[21] Appl. No.: 322,987

[22] Filed: Oct. 14, 1994

[30] Foreign Application Priority Data

Oct. 25, 1993 [DE] Germany .......................... 43 36 364.4

[51] Int. Cl.$^6$ .................................................. C03B 27/044
[52] U.S. Cl. ..................... 65/348; 65/114; 34/635; 34/639
[58] Field of Search .......................... 65/348, 350, 351, 65/114, 118, 119; 34/629, 635, 636, 637, 638, 639, 643; 219/645, 647, 653, 520, 521

[56] References Cited

U.S. PATENT DOCUMENTS

| 4,891,056 | 1/1990 | Reunamäki et al. ...................... 65/348 |
| 5,150,534 | 9/1992 | Kramer ...................................... 34/155 |

FOREIGN PATENT DOCUMENTS

| 0 282 947 | 9/1988 | European Pat. Off. . |
| 2 016 488 | 10/1970 | Germany . |
| 3523675 | 11/1989 | Germany . |
| 4 010 280 | 10/1991 | Germany . |
| 4010280 | 4/1992 | Germany . |

*Primary Examiner*—Donald E. Czaja
*Assistant Examiner*—Calvin Padgett
*Attorney, Agent, or Firm*—Wolf, Greenfield & Sacks, P.C.

[57] ABSTRACT

Apparatus for heating or cooling plate-like or sheet-like flat glass in which the glass is blasted on both sides with a treatment gas, comprising a treatment zone for the flat glass moved substantially longitudinally in the direction of its plane, ejector ribs (5) arranged on both sides of the glass surface and extending transversely to the direction of movement of the flat glass for blowing out the treatment gas, and several ventilators (6) for generating the treatment gas stream supplied to the ejector ribs, with the special feature that at least two transverse flow ventilators per treatment zone are provided as ventilators (6) which are arranged in the vicinity of one or both longitudinal edges of the treatment zone and/or near the longitudinal axis (8) of the treatment zone and with the ventilator axis (7) extending approximately parallel to the direction of movement of the glass surface (10).

13 Claims, 5 Drawing Sheets

APPARATUS FOR THE HEATING OR COOLING OF PLATE-LIKE OR SHEET-LIKE FLAT GLASS

FIELD OF THE INVENTION

The invention relates to an apparatus for the heating or cooling of plate-like or sheet-like flat glass, in which the glass is blasted on both sides with a treatment gas, comprising a treatment zone for the glass surface moved approximately longitudinally in the direction of its plane, ejector ribs (5) arranged on both sides of the glass surface and perpendicularly to the direction of movement of the glass surface for blowing out the treatment gas and several fans (6) for generating the treatment gas flow supplied to the ejector ribs.

BACKGROUND OF THE INVENTION

An apparatus of this kind in the design as a blast convection furnace for heating glass panes fed by means of rollers is known from DE-PS 40 10 280. For a single chamber furnace, or a zone of a multi-zone furnace, this design provides radial blowers in a strictly spatially symmetrical arrangement in order to achieve a very even temperature distribution in the treatment gas flow by means of a strictly symmetric guiding of the flow. However, this aim is achieved by means of a great technical effort, i.e. four radial blowers are required for each single chamber furnace or for each zone of a multi-zoned furnace.

On account of the relatively small intake cross-section of a radial ventilator, the treatment gas is suctioned in a relatively pointed manner out of the interior of the treatment space, which results in relatively large irregularities in the flow out of the interior space so that an even temperature distribution is not strictly ensured even in the case of this elaborate concept.

The required large volume flows of treatment gas, even in the case of four fans per single chamber furnace, or per zone of a multi-zoned furnace, demand such a large rotor outer diameter for each individual radial fan —and thus a correspondingly large structural height of the ventilator together with the fan housing—that in many cases, the desired operation height of approximately 1200 mm cannot be met, or an expensive pit is required for the furnace.

Further, the guidance of the flow of the treatment gas is still angled—together with correspondingly high pressure losses—as the treatment gas must be deflected about 90° when the treatment gas flows into the ejector ribs.

The use of cross-flow fans is already known for numerous applications, even for heating air. However, any advantages from cross-flow fans built into convection heaters for flat glass have been overlooked. Apparently, this is based on prejudices, for example on account of the high heating gas temperatures between 600° and 700° C. which are necessary for heating the flat glass, since the centrifugal loads on the rotating components that are very large for a cross-flow fan are only barely coped with at such temperatures.

Proceeding on the basis of the prior art according to the initially described DE-PS 40 10 280, it is the object of the invention to avoid the disadvantages of this known design and to provide a convection heater or cooler for flat glass operating with a uniform temperature distribution of a treatment gas flow with simple technical means.

SUMMARY OF THE INVENTION

This object is solved in the case of apparatus of the kind initially described in that at least two cross-flow fans per treatment zone are provided as ventilators which are arranged in the vicinity (FIG. 1, 2) of one or both longitudinal edges of the treatment zone and/or near the longitudinal axis (8) of the treatment zone and with the fan axis extending substantially parallel to the direction of movement of the glass surface.

The suggested cross-flow fans make it possible with their specially selected axial arrangement and proportioning to achieve a very even temperature distribution in the treatment gas and thus in the treated flat glass with simple technical means and thus to obtain a high quality of the flat glass surface treatment.

Further advantages are obtained with the features of the dependent claims. The feature of one cross-flow fan is provided for each side of the flat glass sheet saves awkward gas channel guidance between both furnace halves (upper and lower) and makes it possible to balance differences such as occur on account of the lack of presence of rollers in the upper half by means of slightly different performance settings of the blowers ($6_o$) and ($6_u$).

For example, in comparison to radial ventilators, the feature of a rotor length of each cross-flow fan extends over almost the entire length of the treatment zone results in a considerably larger rotor width of the cross-flow fans so that the required large volume flows of the treatment gas can be produced without difficulty with the smallest space requirement, it being possible in most cases to keep the rotor diameter of the cross-flow fans smaller than those of the corresponding radial blowers, which proves to be a decisive advantage in terms of the structural height of the apparatus as a whole. Additionally, a very large intake cross-section for the fan extending over almost the entire length (Z) of the treatment zone is provided, and thus a very even suction out of the interior (11) of the total treatment zone, which contributes considerably to the even temperature distribution in the treatment gas and in the flat glass to be treated. In this case, the desired low operating height of approximately 1200 mm can be maintained even for large operation lengths and operation widths of a treatment zone. Finally, the large intake channel cross-section also allows the easy accommodation of heating or cooling units across a large cross-section and with a small depth, i.e. again with very low pressure losses in the flow. In a particularly advantageous manner, differences in the temperature distribution of the treatment gas can be balanced or purposefully produced along the running length of the treatment zone by means of a varying heating strength along the operation path.

By means of the features of the cross-flow fans have blowing connecting ducts inclined substantially toward the glass surface and suction connecting ducts substantially perpendicular to the glass surface in the treatment space in particular, a guidance of the treatment gas with an extremely small deflection—and thus with a low pressure loss—can be achieved.

A particularly large operating width of the apparatus can be obtained by means of the feature of the ejector ribs extending from opposing blowing feed channels are in alignment with each other in pairs, and with the feature of the ejector ribs are in connection with the rollers for guiding the glass surface and a wall of the suction channel such that no direct radiation exchange can take place between the heating or cooling devices and the glass surface, a particularly good temperature balancing in the treatment gas is obtained, because the gas circulations of the opposing fans are continuously mixed through.

BRIEF DESCRIPTION OF THE DRAWINGS

The invention is described in the following in more detail, by way of an example of a convection furnace for heating glass panes fed over rollers, with reference to the schematic drawing figures, in which.

DETAILED DESCRIPTION

Figure 1:
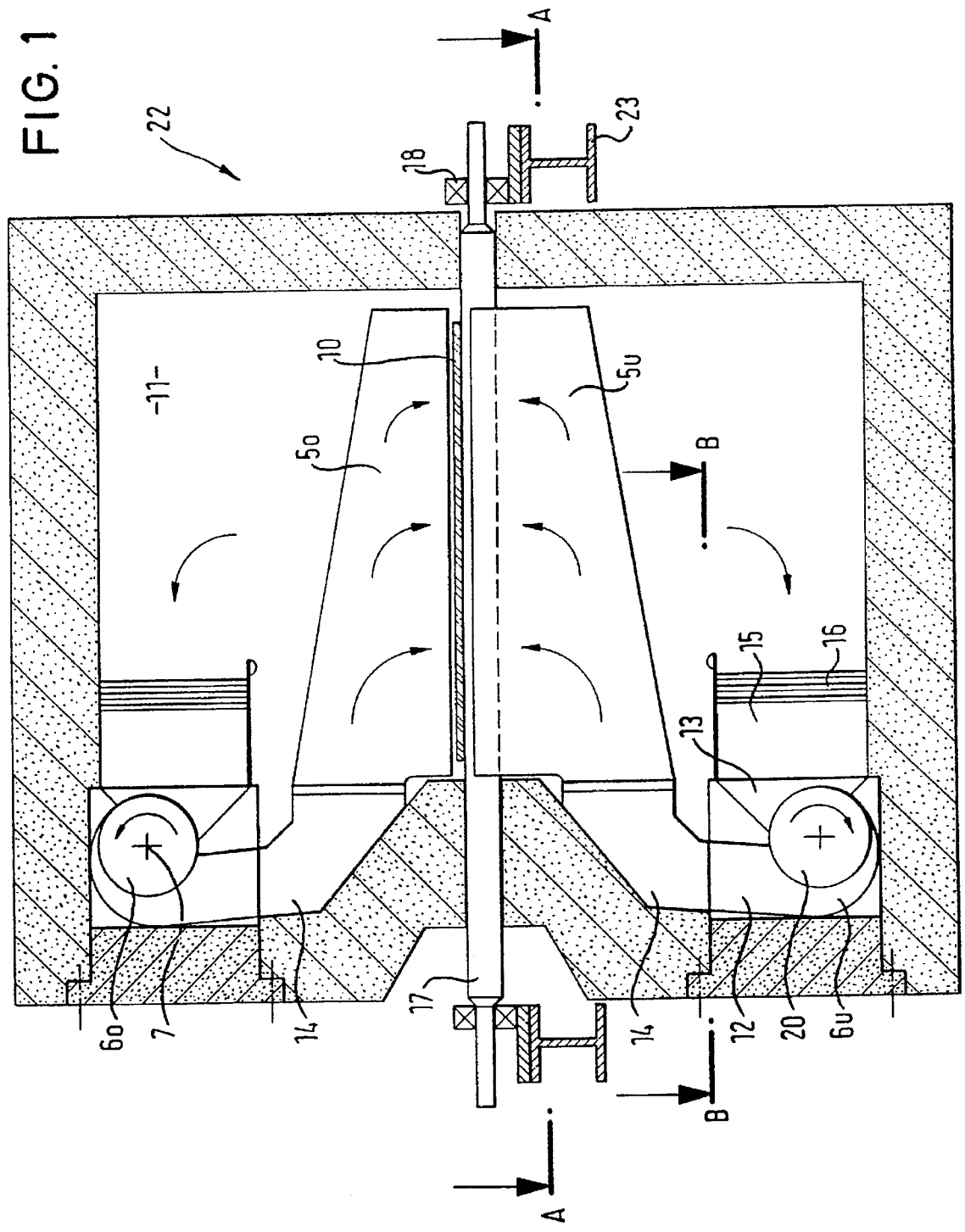
FIG. 1 shows a schematic vertical cross-section through the convection furnace.

The convection heating units shown in FIGS. 1 to 5 for glass panes 10 (see FIG. 5) are generally denoted with the reference sign 22 and have a closed treatment space 11 which has a rectangular cross-section in the vertical cross-section of the shown exemplified embodiment, i.e. the strongly heat-insulated walls of the treatment space 11 form a rectangular box in cross-section.

The glass panes 10 lie on the driven rollers 17 and are transported through the convection heating unit 22 by these rollers 17. In order to avoid an inadmissible deformation of the glass panes 10 softened on account of the heat, the rollers 17 must be appropriately narrowly spaced, i.e. only have a very small mutual spacing, as can be seen, for example, in FIG. 5.

The relatively large working width of such glass panes 10 also requires a relatively large diameter of the rollers 17. It is usual when using ceramic rollers to have roller diameters which are approximately $\frac{1}{35}$ of the free unsupported roller span. In the case of the usual dimensions of the glass panes 10 to be treated, this is approximately shown to scale in FIG. 5.

A heated treatment gas flow, in particular of air, is blown respectively by ejector ribs 5 from below (ejector ribs $5_u$) and from above (ejector ribs $5_o$), the lower ejector ribs $5_u$ being between the rollers 17, i.e. the rollers 17 and the ejector ribs $5_u$ are arranged alternately, as may be particularly seen in FIG. 5.

Figure 5:
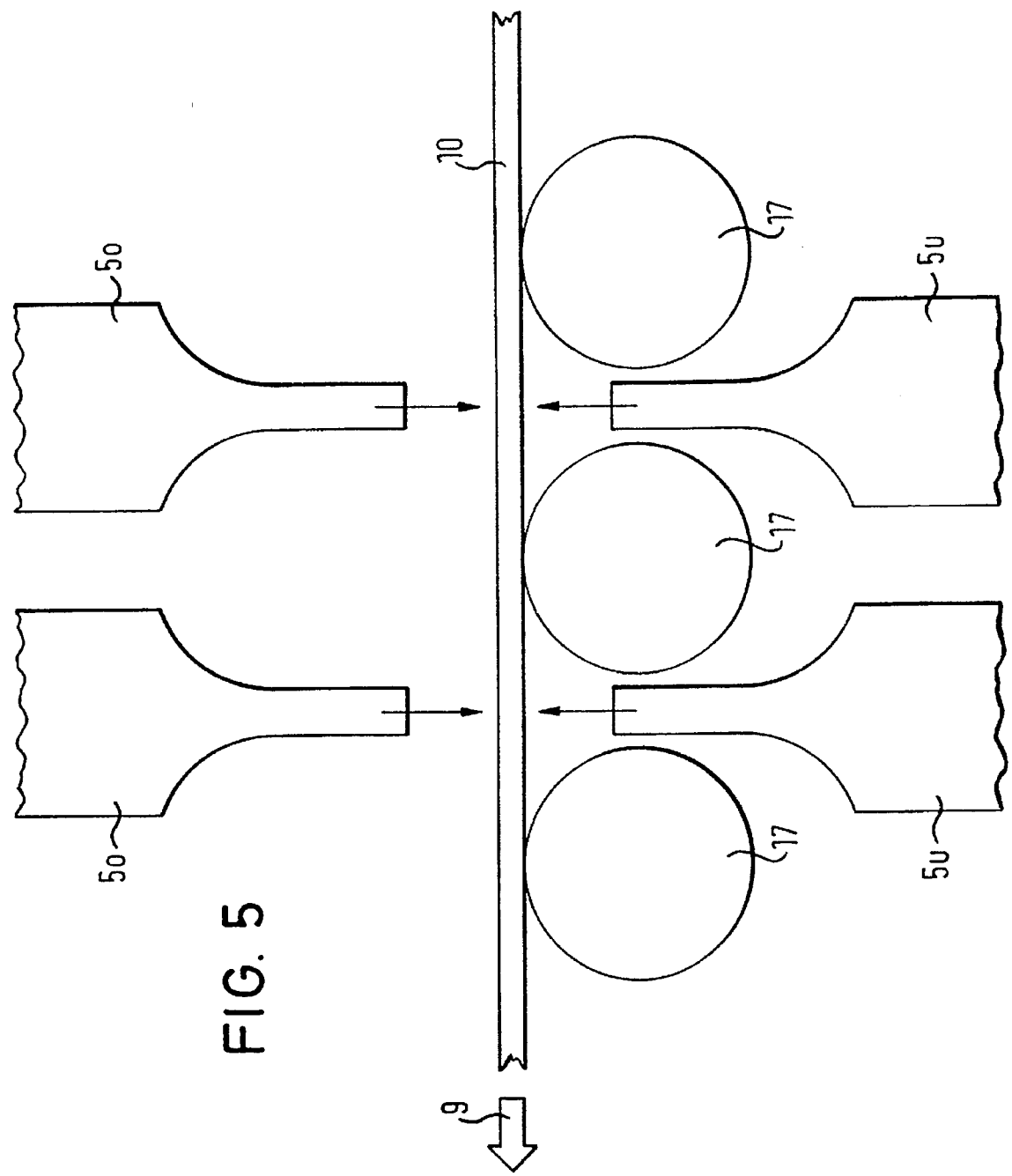
FIG. 5 shows an enlarged longitudinal section, for example along the longitudinal axis 8 of FIG. 3, with rollers 4 guiding the glass panes or a continuous pane glass strip.

The upper ejector ribs $5_o$ above the glass panes 10 are arranged opposite the lower ejector ribs $5_u$, as can also be seen in FIG. 5.

As the cross-section of FIG. 1 shows, the ejector ribs 5 extend over the entire inner width of the convection heating unit, i.e. the treatment space 11, while the rollers 17 (see FIG. 1) project laterally out of the treatment space 11 and are supported and driven outside the treatment space 11. The support is indicated with reference sign 18, a depiction of the drive of the rollers has been omitted.

This means that the roller length depends on the required operating width, on the structure of the wall, which substantially depends on the temperature in the treatment space 11, and on the requirements for the support and drive of the rollers. The support of the rollers 17 is provided in known manner outside the treatment space 11, preferably on a special support structure, the stand 19 of which indicated in FIG. 2.

Blowing feed channels 14 can be seen in FIGS. 1 to 4 which supply the ejector ribs 5 from the side and are appropriately located on a wall of the treatment space 11. The ejector ribs taper from the supply side towards their end, as can be seen in FIG. 1. FIG. 1 shows a view of the blowing channels 5 with the upstream blowing feed channels 14. On account of the narrowing of the flow cross-section of the ejector ribs in the direction of flow, despite the decreasing volume flow, it is provided for that the flow velocity in these ribs is maintained approximately constant.

In the convection heating unit for glass panes shown in the figures, two cross-flow fans serve as the flow generators, the one $6_o$ of which supplies the upper part of the convection furnace, i.e. the associated ejector ribs $5_o$, and the other $6_u$ of which supplies the lower part of the convection furnace with the associated ejector ribs $5_u$.

Small furnaces consist of a single treatment zone (single chamber furnace) and the rotor width of both cross-flow fans (FIG. 1) extends along almost the entire length (in the direction of movement of the glass surfaces) of the treatment zone in accordance with the invention.

Figure 2:
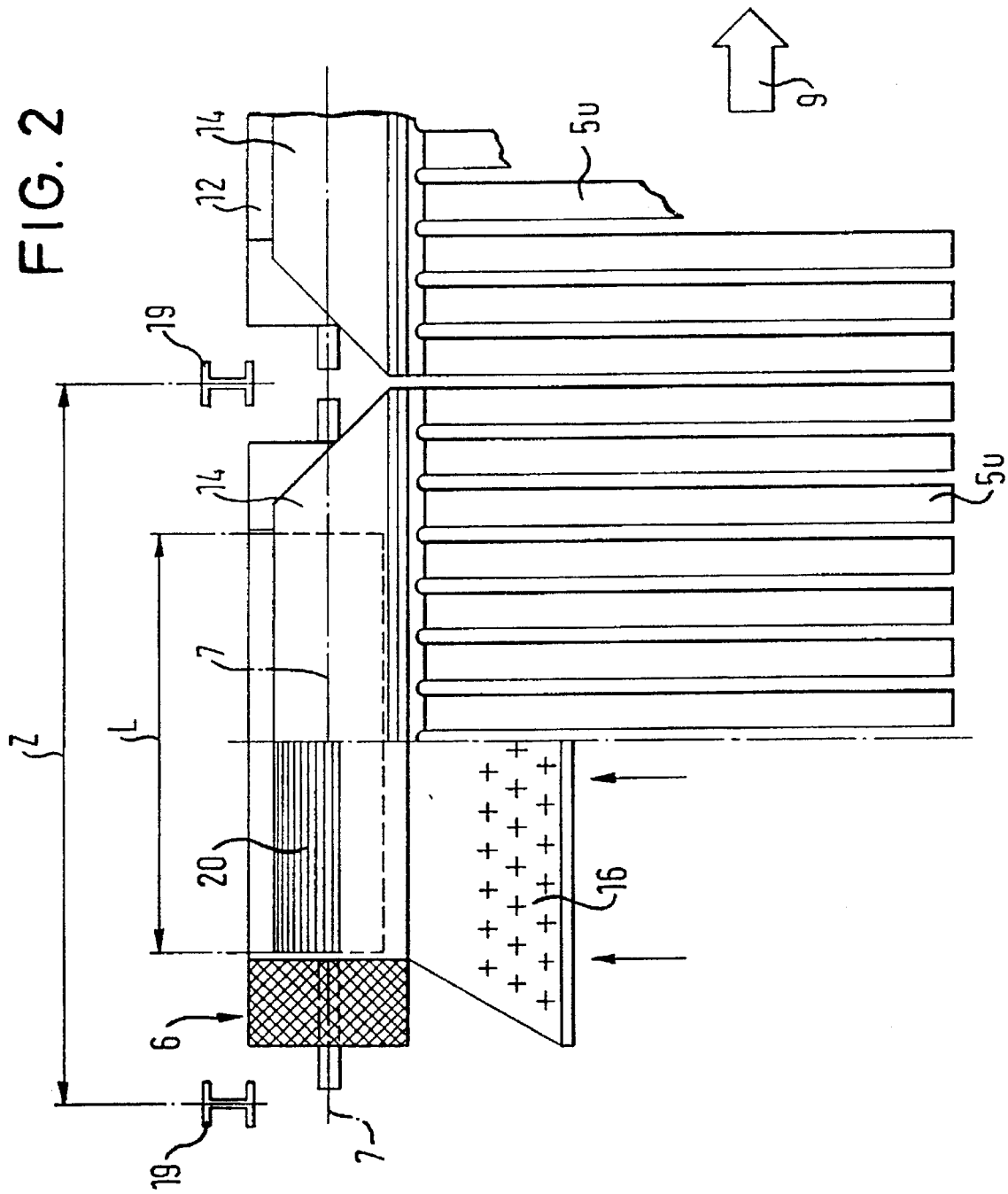
FIG. 2 shows a graduated horizontal section through the convection furnace in which one treatment zone (length Z) appears in full and an adjacent treatment zone is shown to a small extent.

However, a desirable number of such treatment zones can be arranged successively in the longitudinal direction, in a common closed or open furnace or treatment space, as is indicated in FIG. 2 by the addition of an adjacent treatment zone, which again has one or more cross-flow fans. In accordance with the outlines of FIGS. 2, 3 and 4, the roller surface can simultaneously be supportive for a plurality of the same glass sections or smaller and larger flat glass sections.

The design of the cross-flow fans is presumed to be known. However, the special embodiments used here often have more reinforcing rings than normal on the rotor blades in order to be able to cope with the particularly high temperature load.

In a particularly advantageous further development of the arrangement according to claim 7, the cross-flow fan can be slightly inclined in accordance with the invention so that, for example, the front side of the suction feed connection 13 in the blower $6_u$ (FIG. 1) is inclined towards the treatment space 11 and the front side of the blowing feed connection 12 can have a corresponding slope, on account of which the deflection losses in the blowing-out channel 14 are smaller.

As can be particularly seen in FIGS. 1 and 2, for each unit of this convection heating plant, there is one cross-flow fan 6 provided respectively above and below the glass pane 10 and it is located on one wall of the treatment space 11 and blows the treatment gas through the blowing feed channel 14 into the associated ejector ribs 5. In this case, the cross-flow fans 6 of each treatment zone are substantially symmetrically arranged with respect to a symmetrical plane formed through the glass surface 10 (FIG. 5), as can be seen in FIG. 1. In the next unit, this arrangement can also be provided in reverse, i.e. the fans can lie on the right-hand side of the treatment zone instead of the left-hand side as seen in FIG. 1.

To mount a heating device or, in the case of operating a corresponding convection plant as a cooling zone, to mount a cooling device, the entire interior 11 of the treatment space 11 above or below the ejector ribs 5 is available. Preferably, the heating or cooling devices are also arranged in a suction channel 15 for the respective fan, the shape of which is used to influence the flow behaviour in the interior 11 in a desired manner, in particular at the glass surfaces. This results in a very even temperature distribution in the gas flow.

On account of the supply of the ejector ribs 5 of one treatment zone from the one side and in the next treatment zone from the opposite side (in a different manner than according to FIG. 2), differences are balanced out which, for example, result on account of temperature changes of the gas flow when flowing through the ejector ribs 5. If the ejector ribs 5 are always only supplied from the same side of the convection heating plant 22, then a wedge-shaped temperature profile in the material path would not always be excluded on account of this disturbing influence.

It has shown to be useful for each transverse flow rotor 20 to supply the same number of ejector ribs 5, which are the same in terms of their main dimensions in order to also contribute in this way to a uniformly blowing flow.

The mounting of the supports 18 for the rollers 17 is indicated with 23 and 19, a depiction of the roller drive having been omitted.

Figure 3:
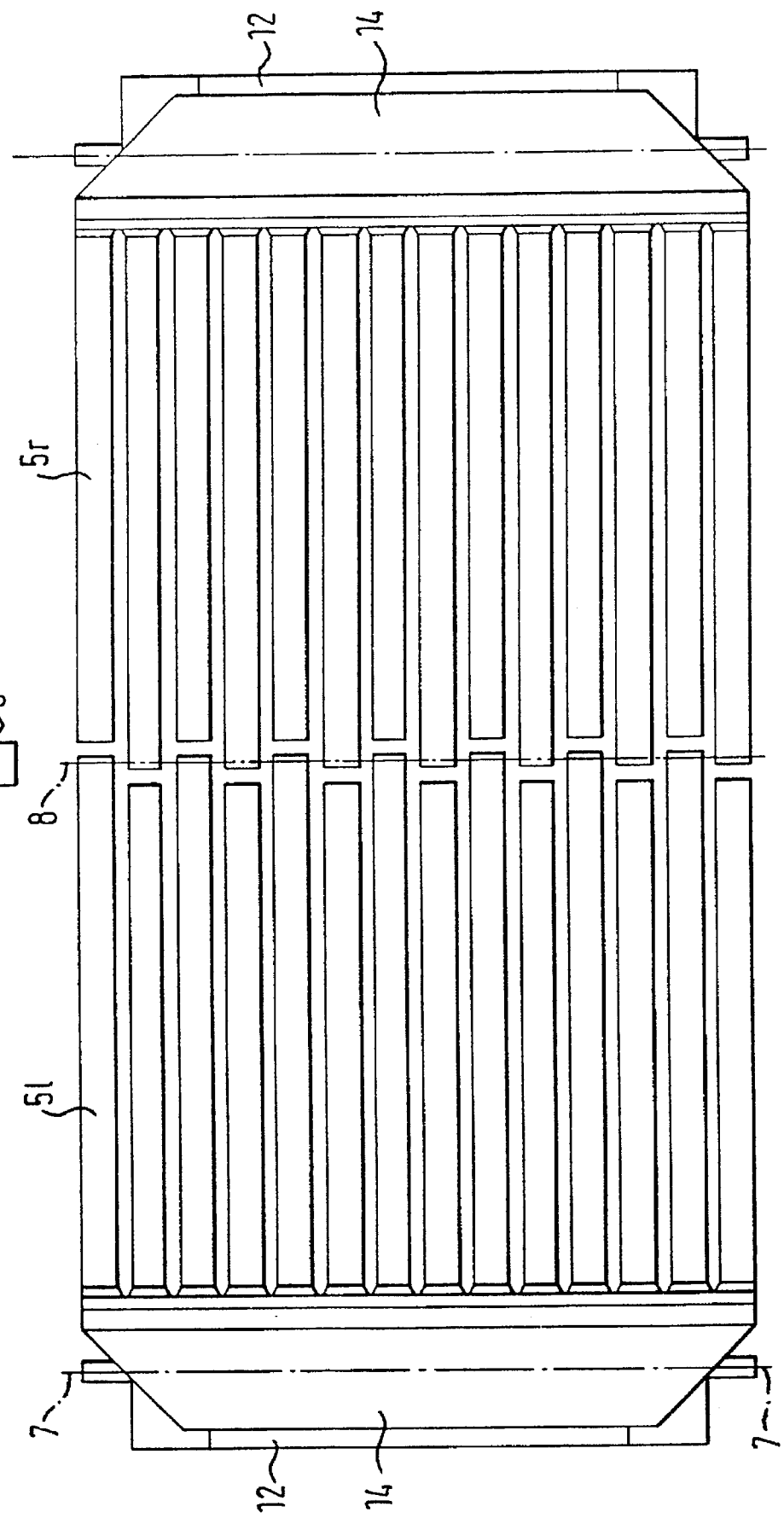
FIG. 3 shows an ungraduated section analogue to that of FIG. 2 through an apparatus with a particularly large operating width.

FIG. 3 shows how even a very large operating width can realized in accordance with the invention in a particularly simple manner. Four cross-flow fans are provided per treatment zone in this case. The shown alternating displacement of the ejector rib ends serves to balance the glass temperature in this critical region.

Figure 4:
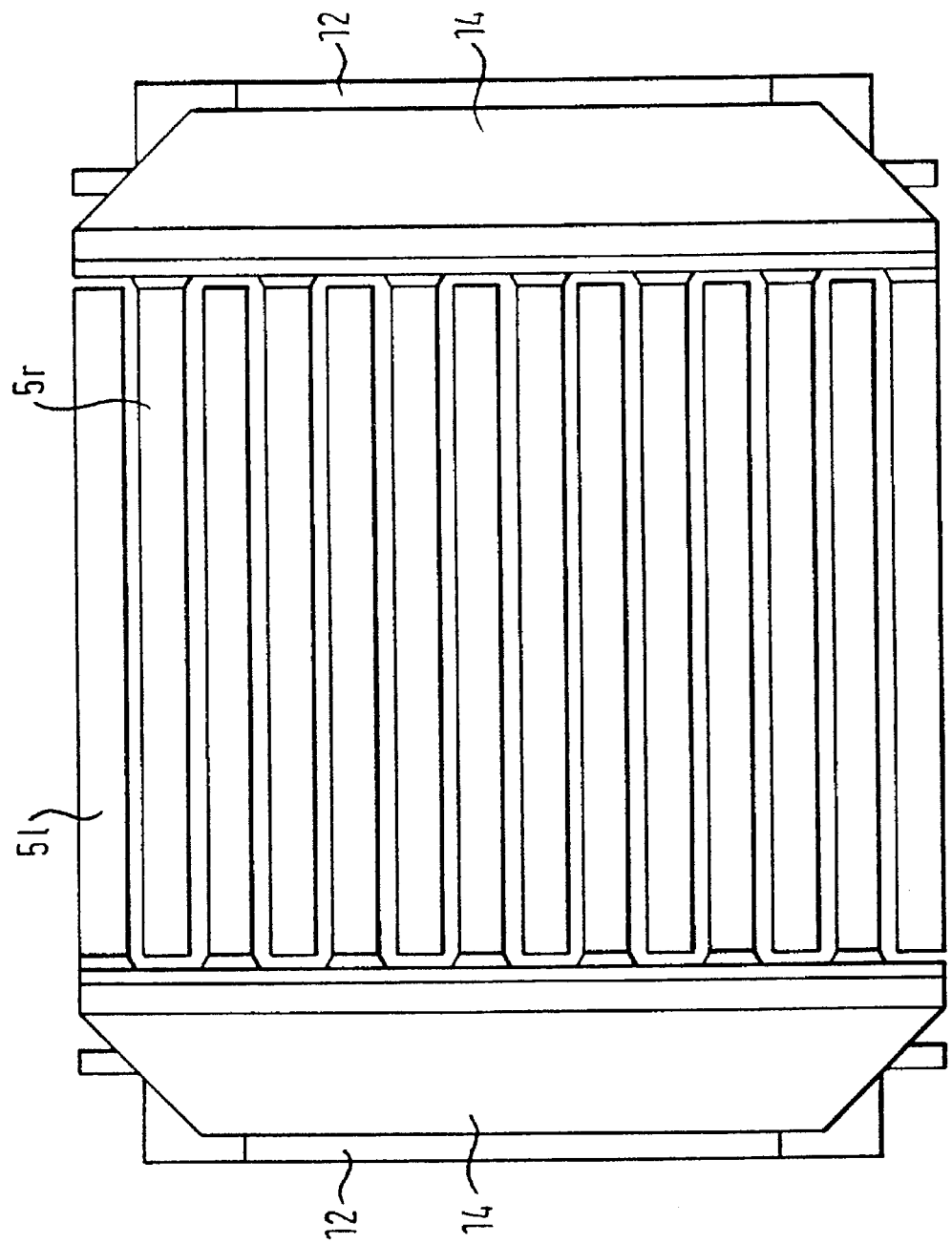
FIG. 4 shows an analogue ungraduated section with one half of the operating width of FIG. 3.

The meshed arrangement of the ejector ribs according to FIG. 4 allows for a particularly good operating gas mixing to be achieved.

FIG. 5 shows the invention in connection with rollers for guiding the flat glass. A solution is also shown for the lower glass side in which no infrared ray from the heating plant can directly impinge on the glass surface 10. It is not shown how this occurs above the glass surface, but such solutions are also within the scope of the invention.

I claim:

1. Apparatus for heating or cooling plate-shaped or strip-shaped flat glass having a glass surface in which the glass is blasted on both sides with a treatment gas, comprising at least one treatment zone for the glass surface moved approximately longitudinally in the direction of its plane, ejector ribs (5) arranged on both sides of the glass surface and transversely to the direction of movement of the glass surface for blowing out the treatment gas and several fans (6) for generating a treatment gas flow supplied to the ejector ribs, the treatment zone or a successive arrangement of such zones being formed as a closed treatment space (11), the apparatus further comprising at least two cross-flow fans per treatment zone provided as fans (6) which are arranged near one or both longitudinal edges of the treatment zone and/or near a longitudinal axis (8) of the treatment zone and with a fan axis (7) extending approximately parallel to the direction of movement of the glass surface (10), the cross-flow fans (6) being oriented such that their blowing connecting ducts (12) are inclined substantially toward the glass surface (10) and their suction connecting ducts (13) are substantially perpendicular to the glass surface in the treatment space (11), the fans (6), the blowing connecting ducts (12) and the suction connecting ducts (13) being located within the treatment space (11).

2. Apparatus according to claim 1, wherein, per treatment zone, one cross-flow fan ($6_o$) is provided for one side of the flat glass and one cross-flow fan ($6_u$) is provided for the other side of the flat glass.

3. Apparatus according to claim 1, wherein a rotor length (L) of each cross-flow fan (6) extends over almost the entire length (Z) of the treatment zone.

4. Apparatus according to claim 1, wherein rollers (17) are provided for guiding the glass surface in a horizontal or substantially horizontal direction of movement (9).

5. Apparatus according to claim 1, wherein a closed treatment gas circulation is provided.

6. Apparatus according to claim 1, wherein a gradually expanding blowing feed channel (14) connects the blowing connecting ducts (12) with the ejector ribs (5).

7. Apparatus according to claim 1 wherein upstream of the suction connecting ducts (13) of the cross-flow fans (6), a suction channel (15) is provided in which a heating or cooling device (16) is arranged.

8. Apparatus according to claim 1, wherein rollers (17) are provided for guiding the glass surface.

9. Apparatus according to claim 1, wherein cross-flow fans (6) together with blowing feed channels (14) and the associated ejector ribs ($5_l$, $5_r$) are provided respectively within one treatment zone or a single chamber apparatus at both longitudinal edges of the treatment zone (11).

10. Apparatus according to claim 9, wherein the ejector ribs (5) extending from opposing blowing feed channels (14) are in alignment with each other in pairs and end near the longitudinal axis (8) of the apparatus.

11. Apparatus according to claim 9, wherein the ejector ribs (5) of mutually opposing blowing feed channels (14) are intermeshed with one another and end at the respective opposing longitudinal edges of the treatment zone.

12. Apparatus according to claim 7 wherein the ejector ribs (5) are designed and dimensioned in such a manner in connection with spacings and diameters of rollers (17) provided for guiding the glass surface as well as a wall of the suction channel (15) that no direct radiation exchange can take place between the heating or cooling devices (16) and the glass surface (10).

13. Apparatus according to claim 1, wherein the ejector ribs (5) are provided with slit-like ejectors.

* * * * *